April 10, 1962 P. J. HOWARD 3,028,705
MULTIPLE CONTAINER FOR PLANTS
Filed Jan. 3, 1961 2 Sheets-Sheet 1

INVENTOR.
PAUL J. HOWARD
BY
Lyon + Lyon
ATTORNEYS

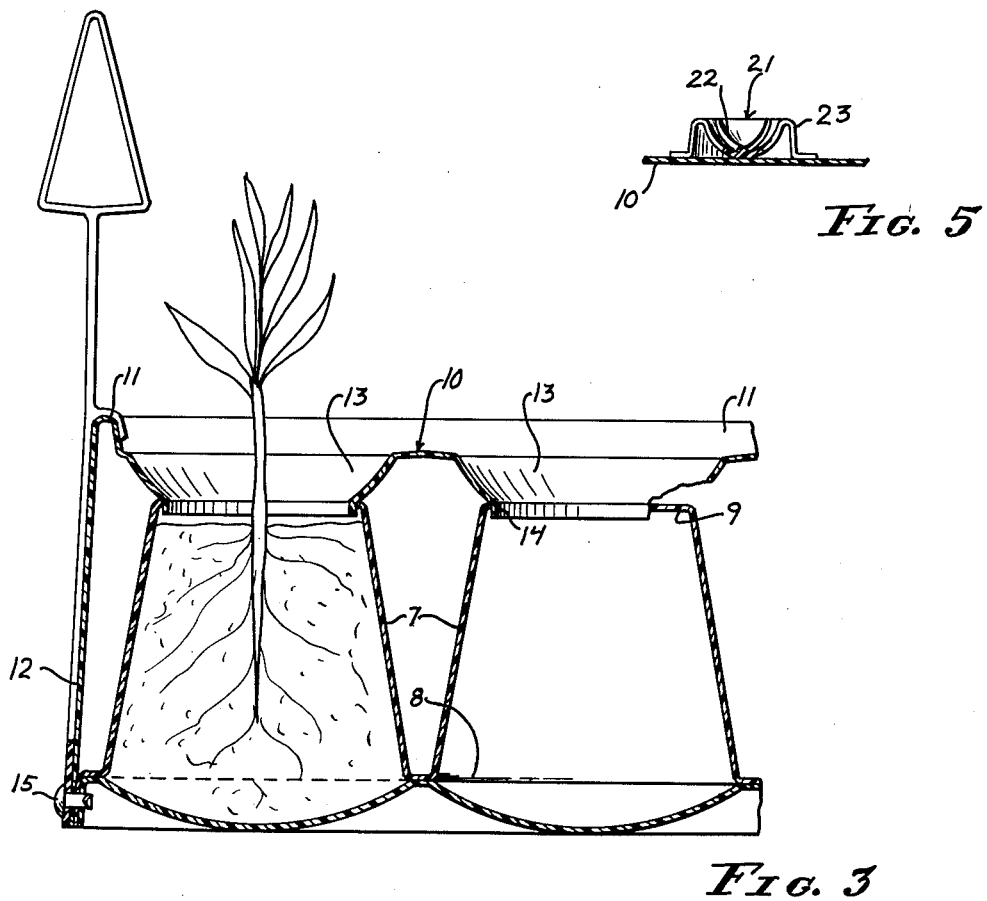
Fig. 5
Fig. 3
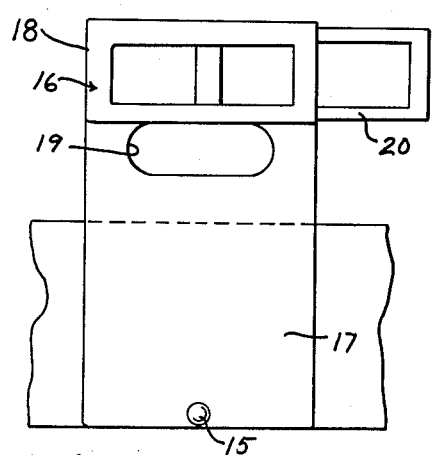
Fig. 4
INVENTOR.
PAUL J. HOWARD
BY
ATTORNEYS

United States Patent Office 3,028,705
Patented Apr. 10, 1962

3,028,705
MULTIPLE CONTAINER FOR PLANTS
Paul J. Howard, 458 N. Barrington Ave.,
Los Angeles, Calif.
Filed Jan. 3, 1961, Ser. No. 80,071
5 Claims. (Cl. 47—37)

This invention relates to multiple containers for plants; that is, to a container for a group of plants such as are sold by a nursery for the purpose of being transplanted. Included in the objects of this invention are:

First, to provide a multiple container for plants having a top deck in which is formed a series of depressions, each forming the mouth of a cell so that soil may be spread over the deck and quickly packed into individual cells, whereupon plants may be placed in each cell.

Second, to provide a multiple container for plants wherein the top deck is provided with a rim, and the depressions forming the mouths to the individual cells are so proportioned that by filling the depressions and the deck within its side walls predetermined equal amounts of water may be supplied to the cells.

Third, to provide a multiple container for plants wherein the contents of each cell rest on an underlying tray, and the cells are so shaped that they, and the top deck as well, may be readily raised from the tray without disturbing the plants or the soil, so that the plants and their surrounding soil rest intact on the underlying tray, free for individual removal.

Fourth, to provide a multiple container for plants, which is initially assembled prior to being packed with soil and provided with plants, then remains intact to permit and facilitate transportation and care of the growing plants; and is not disassembled until the time at which the plants are to be transplanted, thereby facilitating the sale of plants through channels of trade other than nurseries such as markets or other outlets, which are not equipped and do not have the personnel trained for the handling of growing plants in the conventional manner.

With the above and other objects in view, as may appear hereinafter, reference is directed to the accompanying drawings in which:

FIGURE 3 is an enlarged, fragmentary sectional view through 3—3 of FIGURE 1;

FIGURE 4 is a fragmentary end view ilustrating one of the handle members;

FIGURE 5 is an enlarged, fragmentary sectional view through 5—5 of FIGURE 1 showing the sprinkler nozzle receptor.

Figure 1:
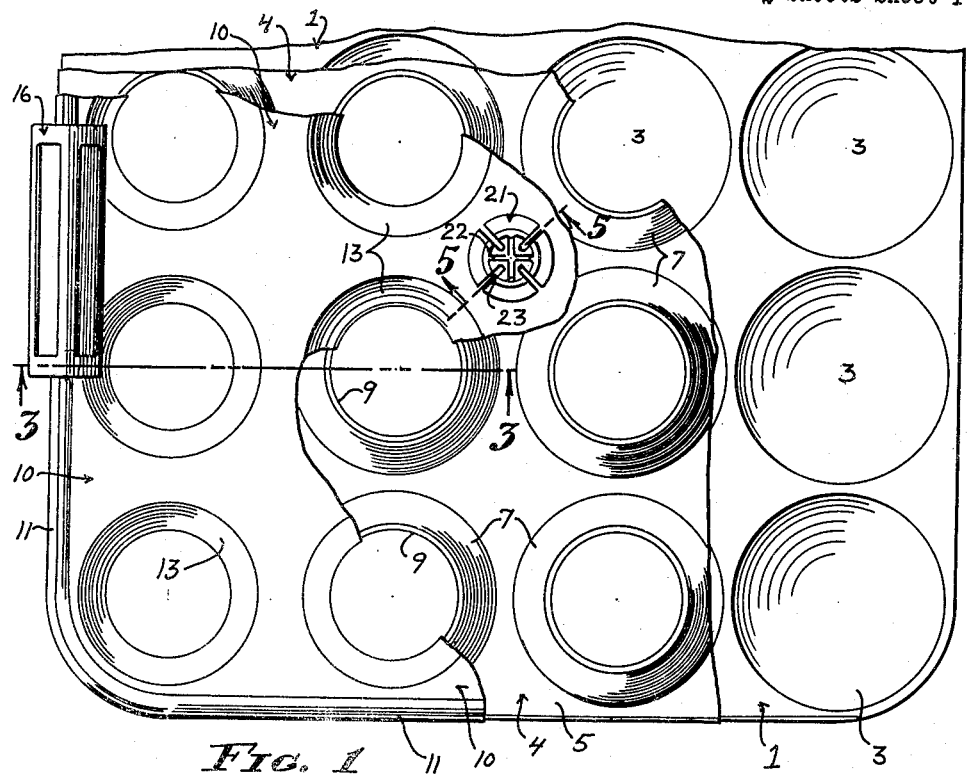
FIGURE 1 is a fragmentary plan view of the multiple container for plants with portions broken away to illustrate the underlying structure.

The multiple container for plants includes a tray structure 1 which is rectangular in plan and is provided with a marginal skirt 2. Formed in the tray structure 1 is a plurality of depressions 3 arranged in rows.

Fitted over the tray structure 1 is a container structure 4 which includes a plate or base 5 which overlies the tray structure 1, and which is provided with a marginal skirt 6 arranged to fit freely over the marginal skirt 2.

The container structure 4 is provided with a plurality of hollow cells 7 which have open lower ends 8, registering with the depressions 3 of the tray structure 1, and open upper ends 9. The walls of each cell taper upwardly so that its upper end is smaller than its lower end.

Fitted over the container structure 4 is a deck structure 10 having an upstanding marginal rim 11 and depending side walls 12, the lower ends of which fit over the marginal skirt 6 of the container structure 4.

Formed in the deck structure 10 is a plurality of depressions 13 having downwardly converging side walls. The side walls of each depression terminate in a depending annular lip 14 which fits within the open upper end of a corresponding cell 7. The depressions 13 thus form funnels, one for each cell. The lower extremities of the side walls 12 are attached to the skirts 6 and 2 by means of fastening elements 15, which may be conventional staples.

Two of the opposite sides of the multiple container may be provided with handles 16 which include tabs 17 that may be attached by selected fastening elements 15. The upper end of the tab is provided with a handle head 18 of triangular cross section and a finger slot 19 below the handle head. The handle head 18 is arranged to receive a triangular insert 20 which may carry data designating the plants carried by the container and other pertinent information. The handle head 18 is slotted to expose the insert and the information thereon.

Centered in the deck structure 10 is a sprinkler nozzle receptor 21 in the form of a semi-spherical cup element having internal ribs 22 to space a sprinkler nozzle from the walls of the receptor and radiating slots 23 for lateral flow of water over the surface of the deck structure 10.

The tray, container, and deck structures are preferably made of sheet plastic which is capable of being vacuum formed. The cells 7 of the container structure 4 may be initially formed as inverted cups, and the initially closed upper ends of the cells may be punched or die cut to form the openings 9. Similarly, the funnel depressions 13 may have initially closed bottom ends which are cut or punched to form the apertures within the marginal lips 14.

As will be described hereinafter, the container structure 4 and deck structure 10 may function as a single unit, that is, removed as a unit from the tray structure 1. Consequently, the lips 14 may be bonded by adhesive or solvent to the margins of the open upper ends 9 of the cells 7, and the lower portions of the side walls 12 may be bonded to the marginal skirt 6 of the container structure 4. It is not necessary to bond these two structures together. However, by so bonding these structures they may be formed of thinner and less expensive material than would otherwise be the case.

The multiple container for plants is utilized as follows:

After assembly of the tray, container, and deck structures soil is packed into the individual cells 7. This may be readily and quickly done as the marginal rim 11 confines the soil and the funnel depressions 13 aid in directing the soil into the individual cells. After the soil is packed in each cell, a seed or small plant is introduced in the conventional manner.

During the growth of the plants, they are watered periodically. The combined volume of the funnel depressions 13 and the space within the marginal rim 11 is such as to constitute a measure of the proper amount of water to be added to the plants. Or if desired, the combined volume of the funnel depressions alone may correspond to the preselected volume of water needed by the plants at each watering. As a consequence, the plants may be properly watered even by inexperienced personnel. As a further aid in watering the plants by inexperienced personnel, the watering nozzle receptor 21 may be utilized, in which case it is merely necessary for the attendant to place the spout of the watering receptacle in the receptor so that the water may flow therefrom without splashing.

It will be observed that the deck structure 10 completely encloses the container structure 4, and is readily kept clean to present an attractive appearance.

Figure 2:
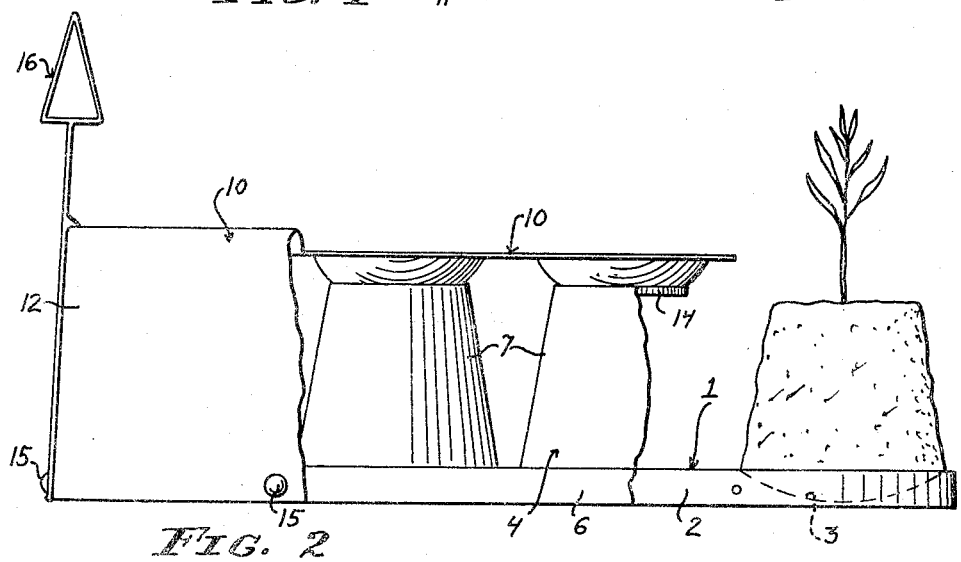
FIGURE 2 is an end view of the multiple container for plants with portions broken away to show the internal construction.

When the plants are sold, they may be transported intact in the container. In order to transplant the plants, the fastening elements 15 are removed and the container and deck structures are lifted from the tray structure. By reason of the upwardly converging surfaces of the cells 7, the soil initially packed in each cell and its plant remains intact, as shown in FIGURE 2. The depressions 3 permit the tray to be handled while preventing accidental dislodgment of the plants. However, the body of soil containing each plant may be readily lifted or slipped by a rotating motion from its depression so that the plant can be transplanted with little or no damage to its root system.

It should be observed that the hereindescribed multiple container for plants is particularly useful in the merchandising of plants through channels other than nurseries, in that the individual plants need not be handled and the problem of watering is simplified so that untrained personnel may be used.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A multiple container for plants, comprising: a tray having a plurality of shallow depressions; a container structure including a plate connected to a plurality of open-ended upwardly converging hollow soil and plant receiving cells disposed with their open lower ends in registry with said depressions; said container structure being upwardly removable from said tray, the height of said cells being so related to the depth of said depressions as to leave the contents of said cells intact on said tray in their respective depressions with substantially all of said contents standing above said depressions.

2. A multiple container for plants, comprising: a tray having a plurality of shallow depressions; a container structure including a plate connected to a plurality of open-ended upwardly converging hollow soil and plant receiving cells disposed with their open lower ends in registry with said depressions; said container structure being upwardly removable from said tray, the height of said cells being so related to the depth of said depressions as to leave the contents of said cells intact on said tray in their respective depressions with substantially all of said contents standing above said depressions; and a deck structure, having apertures therethrough, secured to said container with said apertures in registry with the open upper ends of said cells.

3. A container as defined in claim 2 wherein said deck structure is provided with open depressions, there being one of said apertures in each depression.

4. A container as defined in claim 3 wherein said deck structure includes an upstanding peripheral rim for retaining water thereon.

5. A multiple container for plants, comprising: a tray having a plurality of shallow depressions; a container structure including a plate connected to a plurality of open-ended upwardly converging hollow soil and plant receiving cells disposed with their open lower ends in registry with said depressions; said container structure being upwardly removable from said tray, the height of said cells being so related to the depth of said depressions as to leave the contents of said cells intact on said tray in their respective depressions with substantially all of said contents standing above said depressions; a deck structure, having apertures therethough, secured to said container with said apertures in registry with the open upper ends of said cells; at least said tray and deck structure having peripheral side walls; and removable fastening means releasably securing said side walls together.

References Cited in the file of this patent

UNITED STATES PATENTS

| | | |
|---|---|---|
| 152,758 | Mills | July 7, 1874 |
| 699,154 | De Force | May 6, 1902 |
| 1,904,072 | Nelson et al. | Apr. 18, 1933 |
| 2,567,706 | Hannum et al. | Sept. 11, 1951 |
| 2,893,168 | Kobs | July 7, 1957 |